April 28, 1942.     C. M. JEFFERS     2,281,306
WEIGHT ATTACHMENT FOR PLATFORM BEAM SCALES
Filed Sept. 21, 1940
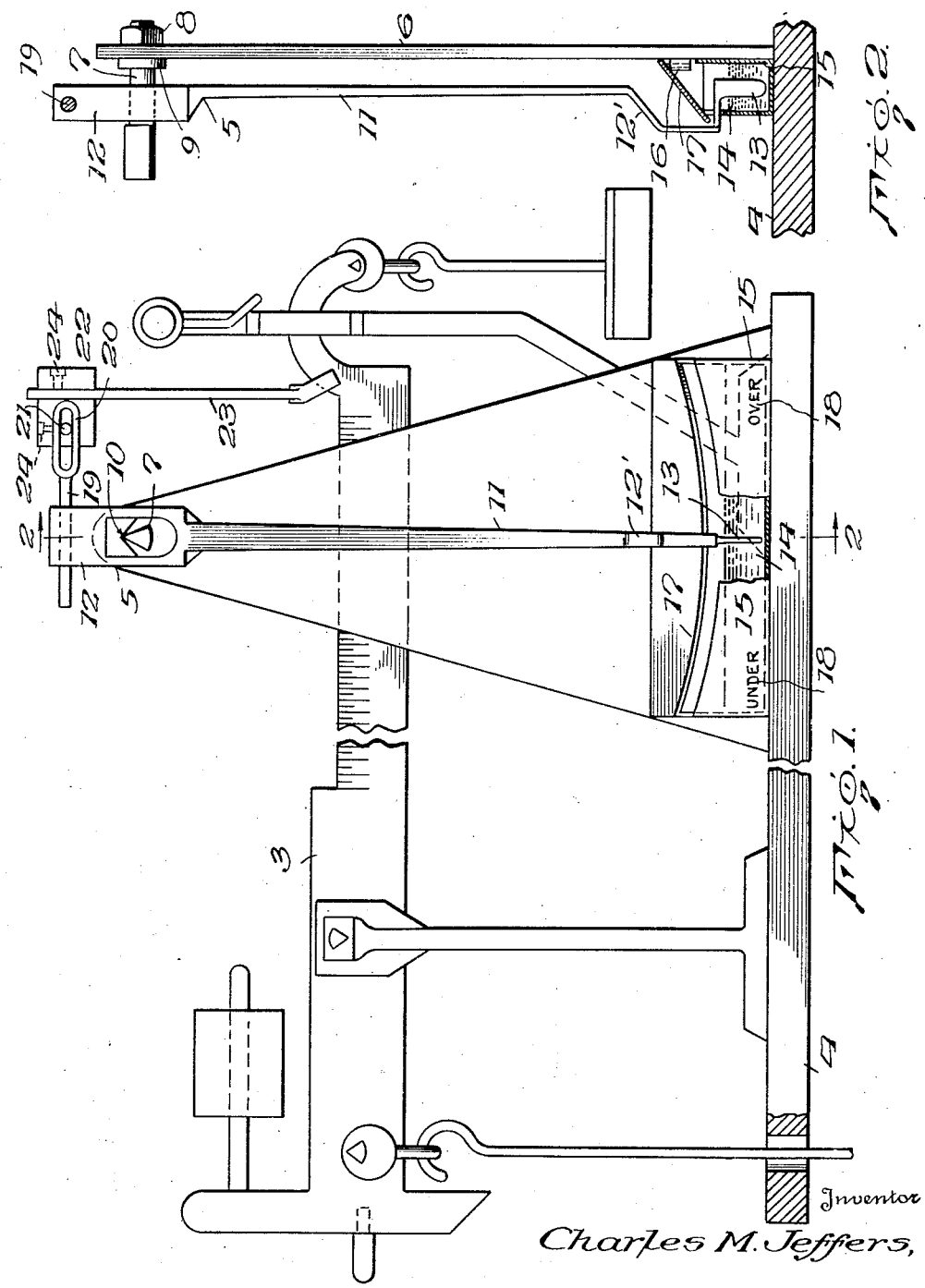
Inventor
Charles M. Jeffers,
By Bernard F. Dawey
Attorney Patented Apr. 28, 1942

2,281,306

UNITED STATES PATENT OFFICE 2,281,306

WEIGHT ATTACHMENT FOR PLATFORM BEAM SCALES

Charles M. Jeffers, St. Joseph, Mo.

Application September 21, 1940, Serial No. 357,806

2 Claims. (Cl. 265—58)

This invention consists of a weight indicator for platform beam scales and is designed for increased accuracy and more expeditious operation on the so-called "exact weight" platform beam scales.

It is, of course, well known in the art to equip platform beam scales with indicators designed to obtain exact weight by indicating weight variances. I have found after experiment that by using a single moving part serving as a combined indicating pointer and oil drag the pointer is brought to a quicker stop and a more accurate reading obtainable.

The device of my invention takes no power from the scale beam and the absence of oil dasher pots, interconnected indicator pointers and oil plungers, vanes and like appurtenances reduces frictional resistance to a minimum.

The device of my invention is unaffected by the vibrations usually prevalent where platform beam scales are employed. Furthermore, in the event of failure of the indicating unit to function, it may be disconnected quickly without the use of special tools and use of the scale continued without readjustment.

It is further the object of this invention to provide an indicator of simplified form capable of attachment to standard types of scales and positively operable regardless of atmospheric conditions.

Other objects of the invention will be understood from the following description of the present preferred form of the invention taken in connection with the accompanying drawing wherein Fig. 1 is a side elevational view of an indicator constructed in accordance with this invention illustrating its application, a portion of the oil container of the indicator being broken away to show the manner of mounting the pointer therein, and Fig. 2 is a vertical sectional view taken on the line 2—2 of Fig. 1 looking in the direction of the arrows.

In order to illustrate the application of this invention, I have, in the drawing, shown a portion of a standard type of platform scale including the scale beam 3. A horizontal supporting bar 4 extends parallel to the scale beam and has superimposed thereon my improved indicator, generally designated 5.

The indicator comprises a supporting plate or bracket 6 which may be of any desired shape and size, the lower end thereof being mounted directly on the bar 4. The upper end of the plate 6 is provided with an opening through which one terminal of a shaft 7 extends. Said terminal is screw threaded and adapted for the reception of a nut 8. The shaft is provided with a collar 9 which bears against one face of the plate 6 as illustrated to advantage in Fig. 2. An intermediate part of the shaft 7 is formed to provide a knife edge bearing 10.

I provide an indicator pointer 11 of novel construction comprising an oblong upper terminal 12 having an opening therein through which the shaft 7 passes. The upper wall of said opening in the oblong terminal 12 is shaped to conform to the contour of the knife edge bearing 10 of the shaft 7. The lower end of the indicator pointer is laterally offset, as indicated at 12', outwardly from the plate 6 and then extends downwardly from the offset portion in parallel relation to said plate, the lower terminal of the pointer being extended inwardly and downwardly at right angles. The downwardly extending terminal, indicated at 13, constitutes a drag or finger which is adapted to be immersed in oil or other liquid 14 carried in a container 15 the latter being mounted on the supporting bar 4. The rear wall of the container 15 is extended upwardly and terminates in a bracket 16 which supports one edge of a lid 17. The lid 17 is disposed at an angle, as illustrated to advantage in Fig. 2, in order to shed extraneous materials from the container. It will be noted that the outer edge of the lid extends appreciably beyond the outer wall of the container 15 in spaced relation to the pointer. Consequently the pointer is free to move between the free marginal edge of the lid 17 and the upper terminal of the outer wall of the container 15.

The container 15 is adapted for the reception of any suitable indicia 18 to indicate, by the position of the indicator pointer in the container, an unbalanced position, either over or under, of the scale beam 3. It is also of course to be understood that the container may be graduated, if desired, for specific indication of the overweight or underweight.

Suitable means is provided for connecting the indicator pointer to the scale beam. This means consists of an arm 19 one end of which extends through the oblong head 12 of the indicator pointer, the opposite end of said arm being formed to provide an ovoid link 20 which is adapted for the reception of a pin 21. The pin is carried by a block 22 which latter is engaged to the upper end of a lever 23, the lower end of the latter being engaged to the free end of the scale beam 3. Set screws 24 are mounted in the block for engagement with the pin 21 and lever 23 in an apparent manner. By this arrangement the weight beam and the indicator pointer are connected through the medium of the pin 21. Consequently, should there be a failure of the indicator unit, or any part thereof, to function, the pin may be removed and the scale operate in the usual manner without any readjustment.

With the device of the present invention there is no lost motion and no parasite frictional resistance. This is principally due to the fact that the indicator pointer 11 and the means used to insure gradual movement of the pointer is integral. Manifestly, when the pointer 11 is moved on its axis, the finger or dasher 13 moves in the liquid 14 thereby dampening the vibrations of the pointer in a manner well known in the art. The movement of the indicator pointer left or right from the vertical shows an unbalanced condition of the scale beam immediately and accurately.

A feature unique with the invention herein shown and described is that the exact weight mechanism may be independently balanced and of course the scale is likewise susceptible of independent balancing. After each has been independently balanced, it remains only to operatively connect the exact weight mechanism and scale. By this construction and arrangement the said mechanism and scale are not dependent on each other for balancing.

It is to be understood that various changes may be made in this invention within the scope of the claims hereto appended.

What is claimed is:

1. In combination with a platform scale beam, a liquid container arranged in proximity to the beam, a lid overhanging the container, an indicating pointer one end of which is operatively connected to the beam, the opposite end being engageable in said liquid, the free end of the pointer being offset to pass around the container lid to position the fluid engaging portion thereof for movement in the same plane as that in which the body portion of the pointer moves.

2. In combination with a platform scale beam, a liquid container arranged in proximity to the beam, a lid overhanging the container, an indicating pointer operatively connected to the beam, the index end of the pointer extending into the liquid of the container beneath the lid, said end lying in the axis of the pointer.

CHARLES M. JEFFERS.